(12) United States Patent  
Carroll et al.

(10) Patent No.: US 11,885,302 B2  
(45) Date of Patent: Jan. 30, 2024

(54) EFFICIENT WIND ENERGY CONVERTOR WITHOUT GEARBOX OR MULTI-POLE GENERATOR

(71) Applicant: University of Strathclyde, Glasgow (GB)

(72) Inventors: James Carroll, Glasgow (GB); William Edward Leithead, Glasgow (GB)

(73) Assignee: University of Strathclyde, Glasgow (GB)

( * ) Notice: Subject to any disclaimer, the term of this patent is extended or adjusted under 35 U.S.C. 154(b) by 207 days.

(21) Appl. No.: 17/281,216

(22) PCT Filed: Sep. 27, 2019

(86) PCT No.: PCT/GB2019/052742  
§ 371 (c)(1),  
(2) Date: Mar. 29, 2021

(87) PCT Pub. No.: WO2020/065345  
PCT Pub. Date: Apr. 2, 2020

(65) Prior Publication Data  
US 2021/0388812 A1 Dec. 16, 2021

(30) Foreign Application Priority Data

Sep. 30, 2018 (GB) ...................................... 1815983  
Oct. 1, 2018 (GB) ...................................... 1816022

(51) Int. Cl.  
*F03D 3/02* (2006.01)  
*F03D 9/25* (2016.01)  
(Continued)

(52) U.S. Cl.  
CPC ............... *F03D 3/02* (2013.01); *F03D 3/005* (2013.01); *F03D 3/06* (2013.01); *F03D 7/06* (2013.01);  
(Continued)

(58) Field of Classification Search  
CPC ... F03D 3/005; F03D 3/02; F03D 3/06; F03D 7/06; F03D 9/25; H02K 7/183;  
(Continued)

(56) References Cited

U.S. PATENT DOCUMENTS 5,151,610 A    9/1992  St-Germain  
6,641,367 B1 * 11/2003 Van der Klippe ........ F03D 1/02  
                                                              416/123

(Continued)

FOREIGN PATENT DOCUMENTS

CN    104832372 A    8/2015  
CN    108291523 A    7/2018  
(Continued)

OTHER PUBLICATIONS

Farhad Ilahi Bakhsh, Dheeraj Kumar Khatod, "Application of variable frequency transformer (VFT) for grid interconnection of PMSG based wind energy generation system," Dec. 2014, Sustainable Energy Technologies and Assessments, vol. 8, pp. 172-180 (Year: 2014).*

(Continued)

*Primary Examiner* — Audrey B. Walter  
(74) *Attorney, Agent, or Firm* — Patterson + Sheridan, LLP (57) ABSTRACT

A vertical axis turbine having a first rotor and at least one second rotor, the first rotor being configured to rotate around a first rotation axis that is vertical or more vertical than horizontal. The first rotor may be configured to be driven and/or rotated by wind or water flow. The at least one second (Continued)

rotor is provided on or coupled to the first rotor such that the first rotor is operable to move the second rotor upon rotation of the first rotor. The second rotor is operable to drive a power take off system. Each second rotor rotates around a respective second rotation axis that may be angled or perpendicular to the first rotation axis of the first rotor. The first and second rotors are configured so that the power take-off system can be driven without the need for a gearbox.

20 Claims, 4 Drawing Sheets

(51) Int. Cl.
*F03D 3/00* (2006.01)
*F03D 7/06* (2006.01)
*H02K 7/18* (2006.01)
*F03D 3/06* (2006.01)

(52) U.S. Cl.
CPC .............. *F03D 9/25* (2016.05); *H02K 7/183* (2013.01); *F05B 2220/706* (2013.01); *F05B 2240/37* (2020.08); *F05B 2240/374* (2020.08); *F05B 2260/70* (2013.01); *F05B 2260/85* (2013.01)

(58) Field of Classification Search
CPC ............ F05B 2220/706; F05B 2240/37; F05B 2240/374; F05B 2260/70; F05B 2260/85
See application file for complete search history.

(56) References Cited

U.S. PATENT DOCUMENTS

| | | | | |
|---|---|---|---|---|
| 8,476,780 B2* | 7/2013 | Hashimoto | ............. | F03D 7/042 |
| | | | | 290/43 |
| 9,013,053 B2* | 4/2015 | Lee | .......... | F03D 13/20 |
| | | | | 290/55 |
| 9,200,614 B2 | 12/2015 | Godsk | | |
| 10,570,880 B2* | 2/2020 | Baun | ......................... | F03D 1/02 |
| 10,724,503 B2* | 7/2020 | Al-Qanaei | ............. | F03D 13/20 |
| 2011/0101691 A1 | 5/2011 | Hashimoto et al. | | |
| 2018/0187649 A1* | 7/2018 | Spruce | .................... | F03D 9/257 |

FOREIGN PATENT DOCUMENTS

| | | | | |
|---|---|---|---|---|
| GB | 2477750 A | | 8/2011 | |
| JP | 2010156317 A | | 7/2010 | |
| WO | WO-02086312 A1 * | | 10/2002 | ........... F03D 1/0608 |

OTHER PUBLICATIONS

International Preliminary Report on Patentability dated Apr. 8, 2021 for International Application No. PCT/GB2019/052742.
International Search Report and Written Opinion dated Dec. 12, 2019 for International Application No. PCT/GB2019/052742.
Japanese Office Action with English Translation in corresponding matter, Application No. 2021-517759, dated Jun. 27, 2023.
Office Action from Chinese Patent Application No. 201980072132.6 dated Sep. 27, 2023, with translation.

* cited by examiner

ND GEARBOX OR MULTI-POLE
EFFICIENT WIND ENERGY CONVERTOR WITHOUT GEARBOX OR MULTI-POLE GENERATOR

FIELD

Described herein is a wind energy converter (WEC), which, optionally but not essentially, may be used as a wind turbine to generate electricity. The present invention also relates to associated methods of generating power from vertical axis turbine and methods of controlling the vertical axis turbine.

BACKGROUND

Turbines can be driven to rotate and hence do work. For example, a wind turbine is driven by the wind, and a generator can produce electricity as the turbine rotates. Most wind turbines have blades which are driven by the wind around a horizontal axis. The blades of a horizontal axis wind turbine can directly face the wind as they rotate, increasing their efficiency.

Conventional vertical axis wind turbines produce electricity from the rotation of a rotor about a vertical axis in use. The design of conventional vertical axis wind turbines is such that they can only operate aerodynamically efficiently if they rotate at relatively low speeds compared to horizontal axis wind turbines, resulting in the rotor of such a turbine producing high torque on the main transmission shaft. These high torques also necessitate a large, heavy, and expensive power-train for converting the high torque, low speed rotation of the rotor into electricity.

V-type vertical axis wind turbines comprise a vertical axis wind turbine with blades that project upwards from a central point or section in a V-shape. This results in the power-train being situated close to the ground, rather than at elevated height. However, the requirements for a large and expensive drive-train remain.

It is at least one objective of one embodiment of the present invention to provide an improved vertical axis turbine for generating electricity that has high efficiency and avoids having a gearbox or generator with a high number of poles.

SUMMARY

According to a first aspect there is provided a turbine comprising a first rotor configured to rotate around a first rotation axis and at least one second rotor. The first rotation axis of the first rotor may be vertical or at least more vertical than horizontal in use. The at least one second rotor may be provided on, comprised in or coupled to the first rotor. The first rotor may be configured to be driven and/or rotated by fluid motion, e.g. by wind or water flow. The first rotor may be operable to drive the second rotor, e.g. by moving the second rotor through the fluid upon rotation of the first rotor. The second rotor(s) may be provided on, comprised in or coupled to the first rotor such that rotation of the first rotor around the first rotation axis moves the second rotor(s), e.g. around the first rotation axis. The second rotor(s) may be operable to drive a power take off system or each second rotor may be operable to drive a respective power take off system. The power take off system(s) may comprise at least an electrical generator and optionally a gearbox. Preferably, the generator may be directly driven by the respective second rotor or optionally the generator may be indirectly driven by the respective second rotor via the respective gearbox.

Each second rotor may be configured to rotate around a respective second rotation axis. The second rotation axis of the at least one second rotor may be angled, e.g. generally perpendicular, to the first rotation axis of the first rotor. At least one or each of the respective second rotation axes about which the second rotor(s) rotate may be or comprise a respective horizontal axis or at least an axis that is more horizontal than vertical, in use. In other words, at least one or each of the second rotors may be horizontal axis rotors. The first and second rotors may be arranged such that the second rotation axis of at least one or each second rotor is tangential to a circular trajectory through which the second rotor(s) are moved by the first rotor.

In an exemplary arrangement, the above turbine may comprise a main (first) rotor, that is driven by the wind or other fluid flow, and is provided with one or more secondary or second rotors that drive power take off systems (preferably directly, without using a gearbox). The second rotor(s) may be moved by rotation of the first (main) rotor such that the movement of the second rotor(s) through the fluid by the first rotor causes the second rotor(s) to rotate and thereby drive their respective power take off system. There are many such arrangements that do not result in an efficient and effective turbine. The turbine must be suitably configured in order to be usable and the first rotor, second rotor(s) and power take off chosen so that in combination the result is a particularly efficient and effective turbine. The choice of many parameters of the turbine, such as torque, tip speed or rotational speed of the first and/or second rotors, power coefficients, and the like, is narrow for the combination of rotor, second rotor(s) and power take off to be efficient and effective without the power take off requiring gearboxes or generators with a large number of pole-pairs.

Maximum aerodynamic efficiency of horizontal axis turbines (e.g. where the primary rotor rotates around a horizontal axis in use) is attained with a tip speed ratio (i.e. the ratio of the speed of the tip of the blade to the speed of the wind perpendicular to the rotor) close to 7. The combination of horizontal axis second rotor(s), operating at a tip speed ratio of 7, mounted on a horizontal axis first rotor, also, operating at a tip speed ratio of 7, would have a combined tip speed ratio close to 49. In a wind speed of 10 m/s, the speed of the tip of the blade is 490 m/s, well in excess of the speed of sound. At a tip speed of 490 m/s, the second rotor(s) are operating far beyond the usable operational range of the secondary rotors The rotation of the first rotor causes the second rotor(s) to move along a circular path with a forward speed relative to the ground, resulting in a thrust force on the second rotor(s). The mechanical power to overcome the thrust force and sustain the rotation of the first rotor and the forward speed of the second rotor(s) is the product of the thrust force times the forward speed of the rotor(s). In turn, the second rotor(s) deliver mechanical power to the power take off. The efficiency of transmission of mechanical power from the first rotor to the second rotor(s) and so to the power take off, is the ratio of the mechanical power delivered by the second rotor(s) to the mechanical power sustaining the rotation of the first rotor. When the second rotors are designed to have similar aerodynamic properties to those of a conventional HAWT rotor and are operating with maximum aerodynamic efficiency, the efficiency of transmission of mechanical power from the first rotor to the second rotor(s) is close to the theoretical limit of ⅔. To compensate for such a low efficiency would require a larger, heavier and more costly first rotor.

However, many of the above disadvantages can be reduced, eliminated or used to advantage in systems that comprise a vertical axis first rotor that is driven by the wind or water flow, but wherein the first rotor moves one or more second rotors through the air or other fluid and the resulting rotation of the second rotors due to their motion through the air or other fluid drives a power take off rather than the power take off being driven by the primary/first rotor.

The aerodynamic efficiency of vertical axis turbines is generally lower than that of a corresponding horizontal axis turbine. In addition, the rotational speed tends to be slower and the torque higher. Indeed, in conventional vertical axis turbines, these features can be an issue, as the reduced aerodynamic efficiency relative to a corresponding horizontal axis turbine often results in a larger vertical axis turbine to produce the same power as the equivalently rated horizontal axis turbine, with the associated drawbacks, e.g. in cost, weight and complexity. In addition, the higher torques on transmission shafts used to couple the rotor to a power take off lead to heavier and more expensive transmission systems.

Many of the above disadvantages of known vertical axis turbines can, also, be reduced, eliminated or used to advantage in systems that comprise a vertical axis first rotor and one or more second rotors.

In an exemplary arrangement, a specific design of vertical axis first rotor is combined with a specific design of second rotor(s) to reduce, eliminate or use to advantage both the disadvantages of a vertical axis wind turbine and the disadvantages of second rotor(s). Aerodynamic considerations impose a maximum value on the tip speed of the blades of the second rotors. In addition, when each secondary rotor directly drives a generator without the need for a gearbox or multi-pole generator, generator considerations impose a minimum value on the rotational speed of the second rotors.

In a first exemplary arrangement, the rotor comprises an upper part with two upper blades in the form of a V and a lower part with two lower blades in the form of an inverted V. One secondary rotor and optionally an associated generator is attached to the tip of each lower blade. Each secondary rotor directly drives the associated generator, which may have 4 pole pairs and a nominal frequency of 25 Hz, without the need for a gearbox. The rotor speeds of the first and second rotors are varied, increasing with wind speed. The mechanical power delivered by the first rotor, $P_F$, is related to the ambient wind speed, reaching a maximum at rated wind speed, $V_R$. The first rotor has maximum aerodynamic efficiency at a tip speed ratio of 4.65. The second rotors operate at a tip speed ratio of 3.13 with an aerodynamic power coefficient of 0.27 and an aerodynamic thrust coefficient of 0.3375. The combined tip speed ratio, the product of the tip speed ratios for the first and second rotors, is 14.57. The mechanical power extracted from the wind by the first rotor is related to the ambient wind speed, $V_R$, and rotational speed of the second rotors, $\Omega_S^2$, by $P_F=28,387V_R^5/\Omega_S^2$. When the rotational speed of the second rotors is 39.21 rad/s and rated wind speed is 12.66 m/s, the tip speed for the secondary rotors is 184.3 m/s and the mechanical power extracted from the wind by the first rotor is 5.99MW. When the turbine is operated with the rotational speed of the second rotors varying, the second rotors deliver 5.02MW of mechanical power to the generators in 12.66 m/s wind speed, 84% of the mechanical power extracted from the wind by the first rotor, increasing to 5.50MW in 20 m/s wind speed, 92% of the mechanical power delivered by the first rotor. The first rotor has an area of 12,351 square meters and a maximum value of aerodynamic power coefficient of 0.39. The second rotors have a combined area of 138.8.

In a second exemplary arrangement, the rotor comprises an upper part with two blades in the form of a V and a lower part with two blades in the form of an inverted V. Two secondary rotors and optionally associated generators are attached to the tips of each lower blade. Each secondary rotor directly drives the associated generator, which may have 4 pole pairs and a nominal frequency of 25 Hz, without the need for a gearbox. The first rotor has maximum aerodynamic efficiency at a tip speed ratio of 4.65. The second rotors operate at a tip speed ratio of 3.13 with an aerodynamic power coefficient of 0.27 and an aerodynamic thrust coefficient of 0.3375. The mechanical power extracted from the wind by the first rotor is $P_F=56,774V_R^5/\Omega_S^2$. When the rotational speed of the second rotors is 39.21 rad/s and rated wind speed is 11.79 m/s, the tip speed for the secondary rotors is 171.6 m/s and the mechanical power delivered by the first rotor is 8.41MW. The second rotors deliver 7.05MW of mechanical power to the generators in 11.79 m/s, 84% of the mechanical power delivered by the first rotor, increasing to 7.91MW in 20 m/s wind speed, 94% of the mechanical power delivered by the first rotor. The first rotor has an area of 21,470 square meters and a maximum value of aerodynamic power coefficient of 0.39. The second rotors have a combined area of 242.3 square meters.

In the first and second exemplary arrangement, the choice of rated wind speed and the tip speed of the second rotors determines all other parameters including the mechanical power delivered by the first rotor, the mechanical power delivered by the second rotors to the generators, the area of the first rotor and the combined area of the second rotors. Modifying either of the exemplary arrangements by increasing the rotational speed of the second rotors while keeping rated wind speed unchanged, reduces the power delivered to the generators, the area of the first rotor and the combined area of the second rotors by the same factor, namely, the ratio of the rotational speeds squared. Increasing the rotational speed of the second rotors in the second arrangement from 39.21 rad/s to 46.46 rad/s reduces the mechanical power delivered by the first rotor from 8.41MW to 5.99MW. Modifying either of the exemplary arrangements by increasing the number of blades comprising the lower part of the first rotor from 2 to 3, whilst keeping the number of secondary rotors attached to the tips of the blades and the total mechanical power delivered to the generators the same, increases the rotational speed of the secondary rotors to 48.02 rad/s and the nominal frequency of the generators to 30 Hz.

The combined efficiency of the first and second rotors in delivering mechanical power to the generators is between 84% and 94%. This high combined efficiency is obtained by having a first rotor with high aerodynamic efficiency, a maximum value of 0.39 for the aerodynamic power coefficient at a tip speed ratio of 4.65, and second rotors with low aerodynamic efficiency, with a value of 0.27 for the aerodynamic power coefficient at a tip speed ratio of 3.13 and a value of 0.8 for the ratio of the aerodynamic power coefficient to aerodynamic thrust coefficient. The tip speed ratio, at which the first rotor has maximum aerodynamic efficiency, is higher for a V-rotor vertical axis turbine than for H-rotor one and a value of 4.65 is more easily obtained for a V-rotor. A value of 0.8 for the ratio of the aerodynamic power coefficient to aerodynamic thrust coefficient can be obtained by designing the secondary rotors to maximise the mechanical power extracted from the wind speed whilst keeping the blade root bending moments constant. The value of 0.27 for the aerodynamic power coefficient at a tip speed ratio of 3.13 is within the normal range for low efficiency rotors designed to this criterion.

The particular arrangement that results in an efficient and effective turbine has the following characteristics.

The first (primary) rotor may rotate around a generally vertical rotation axis and is configured to move the one or more secondary rotors that have generally horizontally orientated rotation axes The first rotor may comprise at least one upper blade and/or at least one lower blade.

The at least one second rotor may be configured such that the power take off is direct drive, i.e. without a gearbox, or semi-direct drive, i.e. with a single stage gearbox.

The power take-off may be configured to provide variable speed operation of the first and second rotors with the rotational speed of the first rotor increasing with wind speed until rated wind speed is reached.

The first rotor may be configured to operate at or close to the maximum value of its aerodynamic power coefficient in below rated wind speed.

The first rotor may be configured to have maximum aerodynamic efficiency at a value of the tip speed ratio in the range 4 to 5, the normal range vertical axis turbines.

The combined first and second rotors may be configured to have high efficiency in delivering mechanical power to the generators when the at least one second rotor is operating at low efficiency.

The at least one second rotor may be configured to have to operate with a tip speed ratio in the range 3 to 4 in below rated wind speed, The at least one second rotor may be configured to operate with a high value of the ratio of the aerodynamic power coefficient to aerodynamic thrust coefficient with a value higher than 0.75 in below rated wind speed.

The first and second rotors may be configured to have the product of the tip speed ratio of the first rotor and the tip speed ratio of the second rotors in the range 14 to 16 below rated wind speed and the tip speed of the second rotors in the range 0.4 to 0.6 times the speed of sound at rated wind speed.

The characteristics of the first rotor, specifically the values of the tip speed ratio and aerodynamic power coefficient, and the characteristics of the second rotors, specifically the values of the tip speed ratio, aerodynamic power coefficient and aerodynamic thrust coefficient, are all subject to tight restriction. On choosing the values for rated wind speed and rotational speed of the second rotor, the values of all remaining variables, including the area of the first rotor and the complete area of the second rotors, are determined. Although, the value of rated wind speed is itself restricted to the range 11 m/s to 13.5 m/s and the nominal rotational speed of the generator should also be restricted to be greater than 20 Hz, there remains sufficient flexibility of design remains to obtain an efficient and effective turbine as illustrated by the first and second exemplary arrangement.

The first rotor may be configured to operate at or close to its maximum aerodynamic power co-efficient ($C_{pmax}$) in below rated wind speed, for example, within 5%. It will be appreciated that the maximum aerodynamic power co-efficient ($C_{pmax}$) varies with the design and configuration of the first rotor and associated blades but could be readily determined by a skilled person for any given rotor and blade configuration/design.

The at least one second rotor may be configured to operate such that the ratio of the aerodynamic power coefficient to aerodynamic thrust coefficient has a value higher than 0.75 in below rated wind speed.

The at least one second rotor may be configured to operate such that the tip speed ratio is in the range 3-4 in below rated wind speed.

The first rotor and at least one second rotor may be configured such that rated wind speed is in the range 11 m/s to 13.5 m/s.

The first rotor and the at least one second rotor may be configured such that the rotational speed of the second rotor(s) is sufficiently high to drive, e.g. directly drive, the power take off. However, if the rotational speed of the second rotor is too high, then the value of the ratio of the aerodynamic power coefficient to aerodynamic thrust coefficient will be less than 0.75. The first rotor and/or the at least one second rotor may be configured such that the product of the tip speed ratio of the first rotor and the tip speed ratio of the second rotors is in the range 14 to 16 and the tip speed of the second rotors in the range 0.4 to 0.6 times the speed of sound at rated wind speed.

The power take off may be configured such that the rotational speed of the generator is greater than 20 Hz at rated wind speed.

The first rotor may comprise at least one upper blade and/or at least one lower blade.

The turbine may be configurable to operate as a wind turbine and/or a tidal stream turbine. It will be appreciated that the rotation axis of the first rotor may be vertical or may be within 10° of vertical or may be closer to vertical than horizontal, in use. If the angle of the first rotor is adjustable or changeable, then the rotation axis of the first rotor may be vertical or may be within 10° of vertical or may be closer to vertical than horizontal in at least some or all of the adjustable or changeable angles of the rotor, in use.

The at least one second rotor may be configurable to convert power from the rotation of the first rotor to rotation of the second rotor. The second rotors may be configured such that a minimum of 80% of mechanical power extracted from the wind by the first rotor is delivered to the generators in all operating conditions, i.e. the turbine may have high efficiency in use.

The first rotor may be configured to have maximum aerodynamic efficiency at a value of the tip speed ratio in the range 4 to 5, the normal range vertical axis turbines.

The at least one second rotor may be configured to drive the power take-off system. For example, the at least one second rotor may be configured to drive an electricity generator. Each of the one or more second rotors may be configured to drive a power take-off system. The power take-off system may comprise an AC generator. The AC generator may be a generator with a number of pole pairs, such as 8 pole-pairs or less or 4 pole-pairs or less. The power take-off system may be a synchronous generator, for example a 25 Hz 4 pole-pair 2.5 MW synchronous generator.

The power take-off system may generate power in use due to the rotation of the at least one second rotor. For example, the rotation in use of the at least one second rotor may drive the associated power take-off system, which may generate power, such as electricity. The power take-off system may be driven, such as directly driven, by the second rotor in use.

By directly driven, it may be meant that the power take-off system rotates at the same speed as the at least one second rotor. For example, each rotation of the at least one second rotor in use may result in one rotation of the power take-off system. The power take-off system may be coupled, such as directly coupled, to the second rotor. For example, the coupling between the at least one second rotor and the power take-off system may advantageously not comprise a gear box. In other words, the turbine may be a gearbox-less or direct drive turbine.

The power take-off may be configured to provide variable speed operation of the first and second rotors with the rotational speed of the first rotor increasing with wind speed until rated wind speed is reached.

The at least one second rotor may be provided on or comprised in at least one of the blades. The lower blades may comprise or be provided with at least one second rotor. The lower blades may each comprise or be provided with a second rotor. At least some of the lower blades may each comprise or be provided with more than one second rotor. The turbine may be configured such that the second rotors are 25 m or less above the ground or sea level, in use, e.g. during the entire operation of the turbine.

The at least one second rotor may comprise the second rotation axis, such as a substantially horizontal rotation axis in use. The at least one second rotor may be, comprise or be comprised in a turbine, such as a second turbine.

The turbine may comprise at least one support structure. The at least one second rotor may be provided on or comprised in the at least one support structure. The at least one support structure may comprise or be provided with at least one second rotor. The at least one support structure may each comprise or be provided with a second rotor. At least some of the at least one support structures may each comprise or be provided with more than one second rotor.

There may be more than one second rotor. The at least one second rotor may be mounted on or comprised in the blades of the first rotor. The at least one second rotor may be attached or mounted on a separate rotating structure that is coupled to the first rotor such that the separate rotating structure is rotatable by the first rotor, e.g. by rotation of the first rotor. At least some or all of the second rotors may be the same distance along and/or in the same relative position on the blades of the first rotor on which the second rotors are supported and/or incorporated. At least some or all of the second rotors may be at and/or near the tips of the blades of the first rotor on which they are supported. The tips of the blades may be the ends furthest from the rotation axis of the first rotor, for example, distal ends of the blades. At least some or all of the second rotors may be the same distance and/or radius from the first rotation axis of the first rotor, e.g. which is substantially vertical in use.

At least some or all of the second rotors may be in the same relative position with respect to the first rotation axis of the first rotor. For example, at least some or all of the more than one second rotors may be arranged rotationally symmetrically around the first rotation axis of the first rotor. At least some or all of the more than one second rotors may follow the same path in use. At least some of the more than one second rotors may be arranged in a plane or configured to rotate in a circle that is substantially perpendicular to the first rotation axis of the first rotor.

The first rotor may be driven in use by fluid such as air (e.g. wind) or water acting on the upper and/or lower blades. The upper and/or lower blades may be configured, configurable, reconfigurable or dynamically reconfigurable to maximise the efficiency of the rotation of the first rotor.

At least some of the upper and/or lower blades may be aerodynamically and/or hydrodynamically designed. At least some of the upper and/or lower blades may be at least partially foil in shape, such as aerofoil or hydrofoil in shape. For example, at least some of the upper and/or lower blades may be foil in shape along at least a part of the blade length.

The turbine may comprise two or more upper blades. The turbine may comprise two or more lower blades. The turbine may comprise the same number of upper blades as lower blades. Tips or distal ends of some or all of the upper and/or lower blades may be free or unconnected, e.g. to other of the upper and/or lower blades.

The upper blades and lower blades may be configured or configurable to at least partially balance the turbine. For example, each upper blade may be paired with a lower blade, and each upper and lower blade pair may lie in a plane. The planes in which upper and lower blade pairs lie may be parallel with the first rotation axis of the first rotor. The upper blades and/or lower blades, such as the upper and lower blade pairs, may be arranged symmetrically, such as rotationally symmetrically, around the rotation axis of the first rotor. The moments arising on the main bearing from the upper blade and from the lower blade act in opposite directions and so partially cancel.

The turbine may comprise a support or tower for supporting the first rotor. The first rotor may be attached, e.g. rotatably attached, and/or secured to the top of the tower or support. The first rotor may be secured and/or attached to the tower at a first bearing. The first rotation axis of the first rotor may lie along an axis of the tower.

The first rotor may be rotatable on the first bearing. The blades, such as the upper and/or lower blades, may be attached and/or secured to the first bearing. The blades may be arranged and/or configurable to reduce and/or minimise the overturning moment acting on the first rotor and/or the first bearing. For example, the overturning moment acting on the first bearing from the upper blades may be substantially or completely countered by the overturning moment acting on the first bearing from the lower blades. The overturning moment acting on the first bearing due to the upper blades in use may act in the opposite direction to the overturning moment acting on the first bearing due to the lower blades in use.

The at least one second rotor may comprise at least one second blade, for example five second blades. The at least one second blades may drive the rotation of the at least one second rotor in use, for example around the respective second rotation axis in use. The at least one second blades and/or the second rotor may be driven by the rotation of the first rotor. For example, the rotation of the first rotor in use may drive the at least one second rotor through fluid, such as water and/or air, and the fluid may act against the second rotor and/or the at least one second blades to rotate the second rotor. The at least one second blades may be configurable to turn, rotate and/or drive the at least one second rotors.

The at least one second rotor may have a rotor solidity of less than 0.07 to 0.09, for example 0.082. Rotor solidity is the total area of the rotor blades to the swept area of the rotor.

At least some of the blades may be arranged and/or configurable to extract energy from fluid acting against the blades. At least some of the upper and/or lower and/or second blades may be arranged and/or configurable to extract energy from fluid acting against the blades.

At least some of the blades, such as blades of the first rotor, may be pitchable. Preferably at least some of the upper blades and/or lower blades, e.g. of the first rotor, may be pitchable. At least some of the blades may be individually pitchable. At least some of the blades may be full span pitchable. At least some of the blades may be substantially straight and/or linear. At least some of the blades may be pitchable around their linear or longitudinal axis, for example rotatable around their linear or longitudinal axis. The turbine may comprise actuators, which may be operable to pitch the blades. The actuators may be at or coupled to the bases of the at least some of the blades. For example, the actuators may be at or coupled to the ends of the at least some of the blades closest to the first bearing. Each blade may be operable by a respective actuator. Each upper and/or lower blade without a second rotor may be operable by an actuator. Each upper and/or lower blade without a second rotor may be pitchable. The actuators may be replaceable and/or accessible in use, such as easily accessible, for example from the base of the turbine in use.

The at least one second blades may be configurable to extract energy from fluid acting against them.

The first rotor may comprise a support member. The support member may be attached and/or secured to the first bearing. The blades, such as the upper and/or lower blades, may be attachable and/or securable to the support member.

The support member may be substantially planar and/or may be or comprise a longitudinal or elongate support member. The support member may be or comprise a bar, circle, triangular, square, or other polygon. The support member may be a polygon, such as a regular polygon, with the same number of corners as the number of pairs of upper and lower blades. The support member may comprise a plurality of bars, and each bar may support at least one upper blade and/or at least one lower blade. The support member may be substantially horizontal and/or perpendicular to the rotational axis of the first rotor in use.

The support member may be aerodynamically and/or hydrodynamically shaped. The support member may be at least partially foil in shape, such as aerofoil and/or hydrofoil in shape. For example, the support member may be foil in shape along at least a part of the length of one of its bars. The support member may be rotationally symmetric.

The upper and/or lower blades, e.g. of the first rotor, may be attached and/or secured at or near the ends, e.g. each end, of the support member. For example, respective upper blades may extend generally upwardly and/or outwardly from each end of the support member and respective lower blades may also extend generally downwardly and/or outwardly from each end of the support member. The upper blades may slope or be angled away from each other, e.g. as they extend from the support member. The lower blades may slope or be angled away from each other, e.g. as they extend from the support member. The upper and/or lower blades may be mounted on the support member such that they are rotationally symmetrically around the rotation axis of the first rotor. The upper blades may be attached to an upper face of the support member in use. The lower blades may be attached to a lower face of the support member in use.

The turbine and/or the first rotor may be rotationally symmetric, e.g. around the rotational axis of the first rotor.

The upper blades may rotate above the tower in use. The lower blades may rotate around the tower in use. The upper blades and/or lower blades may project away from the tower. The tips of the upper blades and/or lower blades may be further from the rotational axis, e.g. which is vertical in use, than the bases of the blades, e.g. which are attached, attachable and/or secured or securable to the first bearing and/or support member.

The upper blades may project generally upwards in use. The upper blades may project generally upwards from the support member and/or the first bearing in use. The upper blades may project at an angle to the vertical in use. For example, the upper blades may make an angle of less than 90° to the vertical in use, preferably an angle of 0° to 45° to the vertical in use, further preferably an angle of 15° to 40° to the vertical in use, more preferably an angle of 25° to 35° to the vertical in use.

The lower blades may project generally downwards in use. The lower blades may project generally downwards from the support member and/or the first bearing in use. The lower blades may project at an angle to the vertical in use. For example, the lower blades may make an angle of less than 90° to the vertical in use, preferably an angle of 0° to 50° to the vertical in use, further preferably an angle of 25° to 50° to the vertical in use, more preferably an angle of 45° to 50° to the vertical in use.

The lower blades may make a larger acute angle to the vertical in use than the acute angle made by the upper blades to the vertical in use. The lower blades may make a smaller acute angle to the vertical in use than the acute angle made by the upper blades to the vertical in use. The upper and lower blades may make the same acute angle to the vertical in use.

The upper blades may be longer than the lower blades. The lower blades may be longer than the upper blades. The lower blades may be of the order of two thirds the length of the upper blades or less.

The upper blades may be up to 200 m long, preferably in the range from 50 m to 150 m long, more preferably in the range from 80 m to 120 m long, for example 100 m long. The lower blades may be up to 140 m long, preferably in the range from 35 m to 105 m long, more preferably in the range from 55 m to 75 m long, for example 65 m long.

The upper blades and/or lower blade tips may have the same radius from the rotational axis, e.g. which is substantially vertical in use. Alternatively, the upper blades and/or lower blade tips may have different radii from the rotational axis, e.g. which is substantially vertical in use.

The at least one second rotor may be on at least one upper blade and/or preferably on at least one lower blade, so the at least one second rotor may rotate around the rotational axis of the first rotor at a radius up to the radius of the tip of the upper blade and/or lower blade tip radius.

The upper blades may all be the same, e.g. the same length and/or profile. The lower blades may all be the same, e.g. the same length and/or profile. The at least one second blade may all be the same, e.g. the same length and/or profile.

At least some or each of the upper blades may be different to at least some or each of the other upper blades. For example, there may be two first upper blades which are the same as each other, and two second upper blades which are the same as each other but different to the first upper blades. Some upper blades may differ from some other upper blades in at least one or more or all of: their shape, size, length, angle to the vertical, number of second rotors and/or whether they are pitchable.

At least some or each of the lower blades may be different to at least some or each of the other lower blades. For example, there may be two first lower blades which are the same as each other, and two second lower blades which are the same as each other but different to the first lower blades. Some lower blades may differ from some other lower blades in at least one or more or all of: their shape, size, length, angle to the vertical and number of second rotors.

The first rotor may comprise a power take-off system. The first rotor may comprise more than one power take-off system, such as more than one electricity generator.

The first bearing may advantageously not comprise a power take-off system. The first bearing may advantageously not comprise a drive-train, such as a conventional turbine drive-train.

The at least on second rotor may be detachable and/or replaceable in use, e.g. to minimise time and effort expended on maintenance and repair. The at least one secondary rotor may be accessible, such as easily accessible, when the turbine is upright and/or in use. For example, the at least one second rotor may be accessible from ground level, sea level, or the level of the base of the tower, when the turbine is upright and/or in use, e.g. the at least one second rotor may be or may always be no more than 25 m from the ground or sea level in use. The turbine may be considered upright when the rotational axis of the first rotor is substantially vertical. The at least one second rotor may be at low height, for example below, such as substantially below, the first bearing and/or support member.

The turbine may be connectable to a power system. The power system may comprise a rechargeable power source, such as a cell and/or battery. The power system may comprise a power grid, such as a national power grid.

The turbine may comprise one or more wind speed and/or direction measurement devices, such as an anemometer, LIDAR, a vane and/or the like.

The turbine may be configured to determine the direction of prevailing wind using the at least one second rotors and the associated power take off system(s). When the at least one second rotors are rotating into the wind, the power generated is increased and/or at a maximum and when rotating away from the wind, the power generated is decreased and/or at a minimum. As such, the turbine may be operable to analyse the variation of power generated by the at least one second rotor and associated power take off system in order to determine the direction of the prevailing wind.

The turbine may comprise a power connector. The power connector may comprise a transformer, such as a rotary transformer or a non-rotatory or conventional transformer, which may be connected via slip rings or the like. The power connector may advantageously comprise a variable frequency transformer or electrical connection. The power connector may be housed in and/or near the tower, for example in and/or near the base of the tower or in a hub of the turbine. The power connector may connect the turbine to an external power system, such as a grid, for example a national power grid. The power connector may be accessible, such as easily accessible, from the base of the tower in use.

The turbine may comprise power converter and/or power electronics. The power converter and/or power electronics may connect the power take-off system to the power connector. The power converter and/or power electronics may regulate the power take-off system, the power connecter and/or the power passing between the power take-off system and the power connector.

The power converter and/or power electronics may control the power connector. For example, frequency of the AC electrical supply to the rotary transformer may be controlled to achieve high efficiency connection, higher than 98%, to an external power system.

The power converter and/or power electronics may control the turbine. For example, the power electronics may control the power take-off and the speed of rotation of the generators by using or by suitably controlling and/or varying the frequency of the AC electrical supply to the generators. For example, below rated wind speed the second rotor speed may be controlled to achieve maximum power generation and above rated wind speed the second rotor speed may be controlled to achieve rated power generation.

The turbine may comprise pitch actuators. The pitch actuators may pitch at least some of the blades. The pitch actuators may control at least some of the blades, e.g. at least the upper blades of the first rotor, to cyclically pitch dependent on rotational position of the blades relative to the prevailing wind direction. For example, the pitch actuators may be configured to control the pitch of at least some of the blades to maximise energy in below rated wind speed, regulate speed of rotation in above rated wind speed and/or provide over-speed protection. The pitch actuators may be housed in and/or near the root of the blades of the upper rotor. The pitch actuators may be accessible, such as easily accessible, from the base of the tower in use.

The centre of mass of the turbine may be low in use. For example, the power connector and the power electronics may be housed at and/or near the base of the tower, which may bring the centre of mass of the turbine down, closer to the base of the tower in use.

The tower may be supported by a platform. The platform may be floatable and/or tetherable. The turbine may be configured to reduce the weight and/or size of the platform relative to the platform of a conventional floating turbine.

According to a second aspect there is a method of generating power using the turbine of the first aspect.

The power generated may be generated by and/or extracted from the rotation of the at least one second rotor.

The method may comprise exposing the turbine to fluid, which may act against the upper blades and/or lower blades to drive the first rotor. The fluid may be air and/or water. For example, wind and/or wave energy may push against the upper and/or lower blades to drive the first rotor. The upper blades and/or lower blades may be configurable to extract energy from the fluid acting against the upper blades and/or lower blades.

The method may comprise configuring the upper blades and/or lower blades such that the tip speed ratio and the rotational speed of the first rotor is high in use, for example, a tip speed ratio in the range 4 to 5.

The method may comprise configuring the first rotor and/or the at least one second rotor such that the tip speed ratio and the rotational speed is low in use, for example, a tip speed ratio in the range 3-5. The maximum tip speed of the at least one second blade in use may be high, such as 160 m/s to 200 m/s at rated wind speed, for example 180 m/s.

The method may comprise arranging the turbine such that rotation of the first rotor through the fluid drives the at least one second rotor through the fluid, e.g. through the air or water. The fluid may act against the at least one second rotor to drive the at least one second rotor. For example, the fluid may act against the second blades of the at least one second rotor to rotate the at least one second rotor.

The rotation of the at least one second rotor may drive the at least one power take-off system, which may generate power, for example electricity. The at least one second rotor may drive the power take-off system without a gearbox or a multi-pole generator. For example, the rotation of the at least one second rotor may drive the at least one power take-off system directly. The rotation of the at least one second blades in use may directly drive the power take-off system.

The power generated by the at least one second rotor may be cyclic, sinusoidal and/or periodic. For example, the at least one second rotor may be alternatively driven against the flow of fluid and with the flow of fluid, as the first rotor rotates. The power generated by the at least one second rotor may be greater when the at least one second rotor is driven against the flow of fluid than when the at least one second rotor is driven with the flow of fluid. The cyclic, sinusoidal and/or periodic power generated by the at least one second rotor may increase the efficiency of the power generated by the second rotor. For example, the cyclic, sinusoidal and/or periodic power generated by the at least one second rotor may increase the energy extracted from the fluid acting against the at least one second rotor. For a sinusoidal variation in the speed of flow of the fluid over the second rotors with amplitude A and a mean speed of flow of $\bar{V}$, the energy extracted increases by the factor $[1+3/2(A/\bar{V}))^2]/[1+\frac{1}{2}(A/\bar{V}))^2]$. The determination of the cyclic, sinusoidal and/or periodic power generated by the at least one second rotor may be used to determine the direction of the prevailing wind.

The cyclic, sinusoidal and/or periodic power generated by the at least one second rotor may be used to calculate and/or determine the speed and/or frequency of the rotation of the first rotor.

The power generated by the first rotor may be cyclic, sinusoidal and/or periodic. The point of maximum power generation by the first rotor may coincide with the point of minimum power generation by the at least one second rotor. The cyclic, sinusoidal and/or periodic nature of the power generated by the at least one second rotor may be reduced by the out-of-phase cyclic, sinusoidal and/or periodic power generated by the first rotor.

According to a third aspect there is a method of controlling the turbine of the first aspect or the second aspect.

The turbine may be configurable to have maximum efficiency under particular conditions. For example, the turbine may be most efficient at extracting energy from fluid acting against the turbine when fluid of a particular desired speed or within a particular desired speed range is blowing against the turbine. The turbine may be rated to produce a maximum power under these conditions. The turbine may be rated or configurable to extract a maximum energy from fluid acting against the turbine under these conditions.

For example, when the turbine is operating as a wind turbine, the turbine may be configurable to operate most efficiently in wind speeds below a rated wind speed in the range 11 m/s to 13.5 m/s. The turbine may be configurable to produce megawatts of power, for example multi megawatts of power, such as up to 10 MW, for example 5.9 MW.

When the turbine is operating as a wind turbine, the method may comprise configuring at least one second rotors to operate most efficiently in effective wind speeds up to 65 m/s, for example 59 m/s. The effective wind speed of the at least one second rotor is the addition of the wind speed and the relative speed of the at least one second rotor as the first rotor rotates. The method may comprise configuring the at least one second rotor to produce megawatts of power, such as up to 5 MW, for example 2.5 MW.

The method may comprise pitching at least some of the blades, for example upper blades and/or lower blades without second rotors. The method may comprise pitching the upper blades. The method may comprise pitching the upper blades to fix the orientation of each upper blade to the flow of the fluid as the first rotor rotates. For example, the upper blades may be pitched cyclically. At least some of the blades may be pitched at the same frequency as the rotation of the first rotor. At least some of the blades may be pitched when the turbine is operating below its maximum energy rating, for example when the wind is blowing against the turbine at less than a particular desired speed or a particular desired speed range. Pitching at least some of the blades, such as the upper blades, may increase the energy generated by the turbine. For example, pitching at least some of the blades, such as the upper blades, may increase the energy extracted from the wind blowing against the turbine.

At least some of the blades may be pitched to increase or optimise the efficiency with which energy is transferred from the fluid acting against the vertical axis turbine to the turbine, relative to the energy transfer from the fluid to the vertical axis turbine when the blades are not pitched and/or have a fixed pitch relative to the rotation of the turbine. For example, at least some of the blades may be pitched to increase or optimise the speed of rotation of the first rotor. When the turbine is operating as a wind turbine, at least some of the blades may be pitched to fix the orientation of those blades to the wind. For example, at least some of the blades may be cyclically pitched to maximise the energy transfer from the wind to those blades.

The method may comprise determining the direction of fluid flow acting against the turbine. The direction of fluid flow may be determined from the position of the first rotor when the cyclic, sinusoidal and/or periodic power generated by the at least one second rotor is at a maximum. For example, when the power generated by the at least one second rotor is at a maximum, the at least one second rotor is being driven by the first rotor directly in to the fluid flow.

The speed and/or frequency of the pitching of at least some of the upper blades and/or lower blades may be based on the cyclic power generated at the at least one second rotor. For example, at least some of the upper blades and/or lower blades, such as the upper blades, may be pitched at the same frequency as the power generated at the at least one second rotor.

At least some of the blades may be pitched to decrease the efficiency with which energy is transferred from the fluid acting against the turbine to the turbine, relative to the energy transfer from the fluid to the turbine when the blades are not pitched and/or have a fixed pitch relative to the rotation of the turbine. For example, at least some of the blades may be pitched to decrease the speed of rotation of the first rotor and/or to stop the first rotor rotating. At least some of the blades may be pitched to provide over-speed protection. For example, at least some of the blades may be pitched to prevent the first rotor rotating too quickly, for example to prevent damage to the first rotor and/or the first bearing.

The method may comprise controlling the rotor speed of the at least one second rotor. The method may comprise controlling the rotor speed of each second rotor individually. The rotor speed of at least one second rotor may be controlled by controlling the frequency of the voltage across the at least one second rotor, for example across the power take-off system of the at least one second rotor. The drag of the at least one second rotor may be used to control and/or affect the rotational speed of the first rotor.

The rotor speed of the first rotor may be variable and controlled by collectively pitching the upper blades when the turbine is operating above its maximum energy rating, for example when the wind is blowing against the turbine at more than a particular desired speed or a particular desired speed range. The upper blades may be pitched to control the rotor speed of the first rotor in response to relatively low frequency changes in the wind speed. The rotor speed of the at least one second rotor may be controlled, for example by controlling the frequency of the voltage across the at least one second rotor, in response to relatively high frequency changes in the wind speed.

When the wind is blowing against the turbine at more than a particular desired speed or a particular desired speed range, it may be possible to store some of the power of the rotating first rotor in reserve, for example in a flywheel, compressed air storage, electrochemical cell and/or the like. The power may be extracted from the reserve later, when the wind speed has dropped.

The method may comprise monitoring the power generated by the turbine. The method may comprise controlling the turbine in response to the power generated by the turbine. The power generated by the turbine may be monitored by and/or the control of the turbine may be performed by the power electronics. The power electronics may be controlled by the programmable computer.

It should be understood that the individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

At least one embodiment of the invention will now be described, by way of example only, with reference to the accompanying drawings, in which.

DETAILED DESCRIPTION OF THE DRAWINGS

Throughout the following description, identical reference numerals will be used to identify identical parts.

Figure 1:
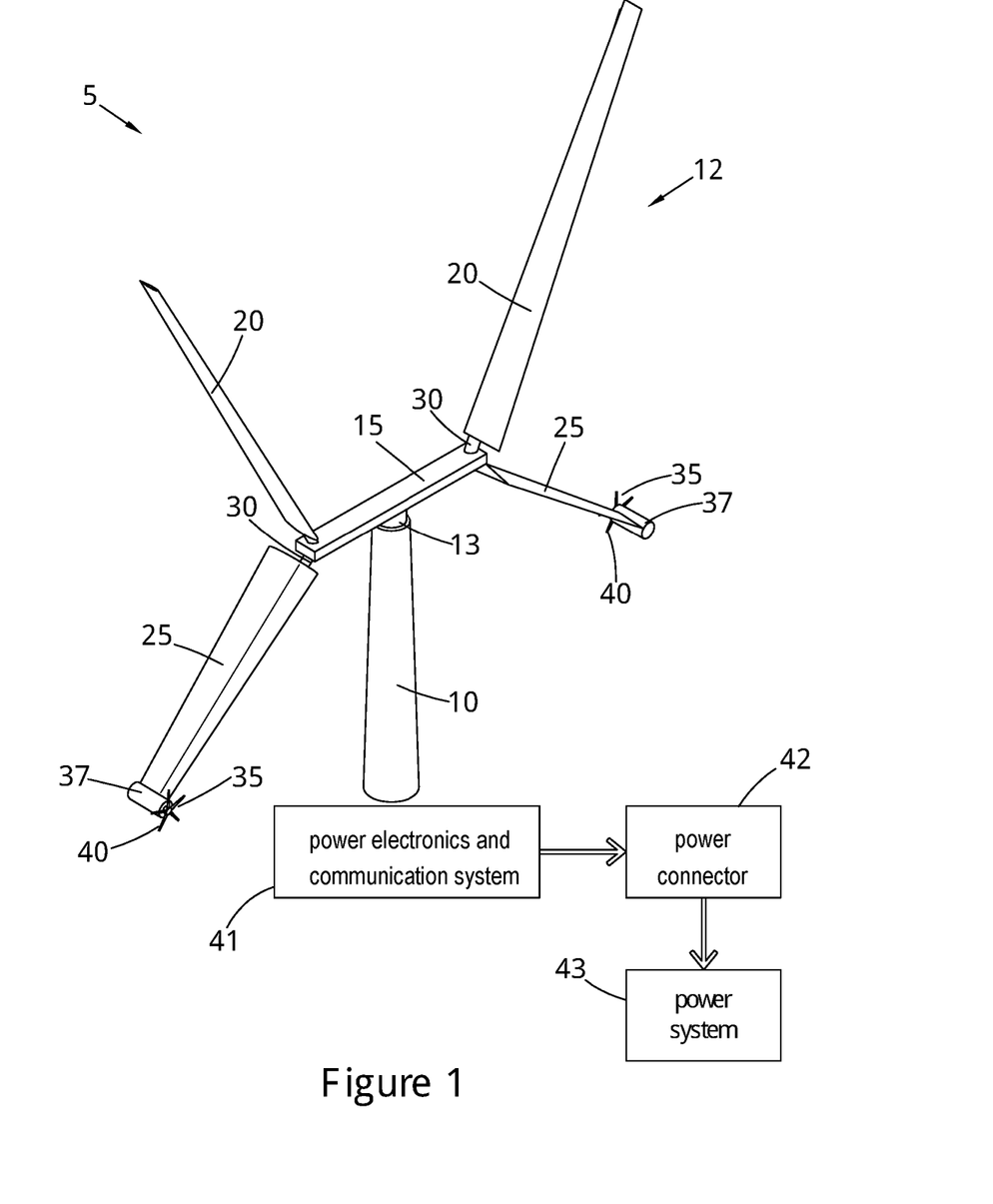
FIG. 1 shows a perspective view of a vertical axis turbine.

FIG. 1 shows a vertical axis turbine 5 with a tower 10 and a first rotor 12. The first rotor 12 is attached to the tower 10 at a first bearing 13. The first rotor 12 rotates on the first bearing 13. The first bearing 13 is at the top of the tower 10. The first rotor 12 has a support member 15. The first rotor 12 is attached to the first bearing 13 in the centre of the support member 15.

Two upper blades 20 are attached to the support member 15, and the upper blades 20 project obliquely upwards and away from the tower 10. Two lower blades 25 are attached to the support member 15, and the lower blades project obliquely down and away from the tower 10. The upper blades 20 and the lower blades 25 are attached to the support member 15 by attachment points 30. The attachment points 30 for the upper blades 20 include actuators which can pitch the upper blades 20. As the first rotor 12 rotates relatively slowly in use, the pitching of the upper blades 20 is also relatively slow, and so the duty cycle of the actuators is low. The actuators therefore have low maintenance costs.

The lower blades 25 include respective second rotors 35 and associated electricity generators 37 at the ends of the lower blades 25. The second rotors 35 include second blades 40. The second rotors 35 are each configured to drive the associated electricity generator 37. The second rotors 35 face in opposing directions, so that rotation of the first rotor 12 results in both second rotors 35 being driven along the same path in the same orientation in use.

The upper blades 20, lower blades 25 and support member 15 are configured such that when wind blows against the vertical axis turbine 5, the first rotor 12 rotates clockwise around the first bearing 13 (although it will be appreciated that a configuration in which the rotation direction is reversed could be provided). This rotation drives the second rotors 35 through the air. The air acts against the second blades 40 of the second rotors 35, which causes the second rotors 35 to rotate. This in turn powers the electricity generators 37 driven by the second rotors 35. Thus, the first rotor 12 acts to rotate the second rotors 35, and the rotation of the second rotors 35 drives the generators 37. As such it is the rotation of the second rotors 35 rather than the first rotor 12 that primarily drives the generators 37.

The horizontal axis second rotors 35 are unusually designed to operate with a low value of $C_P$ and high $C_P$ to $C_T$ ratio and a low blade tip speed ratio, in contrast to conventional horizontal axis wind turbines. The second rotors 35 are also designed to operate with a high blade tip speed, of the order of 160 m/s. If the blade tip speed of the second rotor 25 were much higher, the second rotor 35 would become incompatible with the required high-lift and low-drag aerodynamic characteristics.

As the second rotors operate at relatively high blade tip speed with relatively short second blade 40, the second rotors 35 rotate at high speed, e.g. up to 50 rad/s. This results in each of the second rotors 35 being able to directly drive the respective associated electricity generator 37 without the need for a gearbox or multi-pole generator. This simplifies the second rotor 35 and therefore reduces the cost of the second rotor 35.

As there is no power take-off system at the first bearing 13, there is no need for a large, heavy and expensive drive-train at the first bearing 13. This greatly simplifies the vertical axis turbine 5 and greatly reduces its cost.

Power electronics 41 are included at the base of the tower 10 and are easily accessible. As the power electronics 41 are easily accessible, maintenance costs are relatively low. The power electronics 41 are used to monitor and control the vertical axis turbine 5 and the power the vertical axis turbine 5 generates.

The power electronics 41 are connected to a power connector 42. The power connector 42 connects the vertical axis turbine 5 to a power system 43, such as a national power grid.

As the power electronics 41 are located at a low height, they can easily be accessed from the level of the base of the tower 10. This provides for easy and low cost maintenance.

Figure 2:
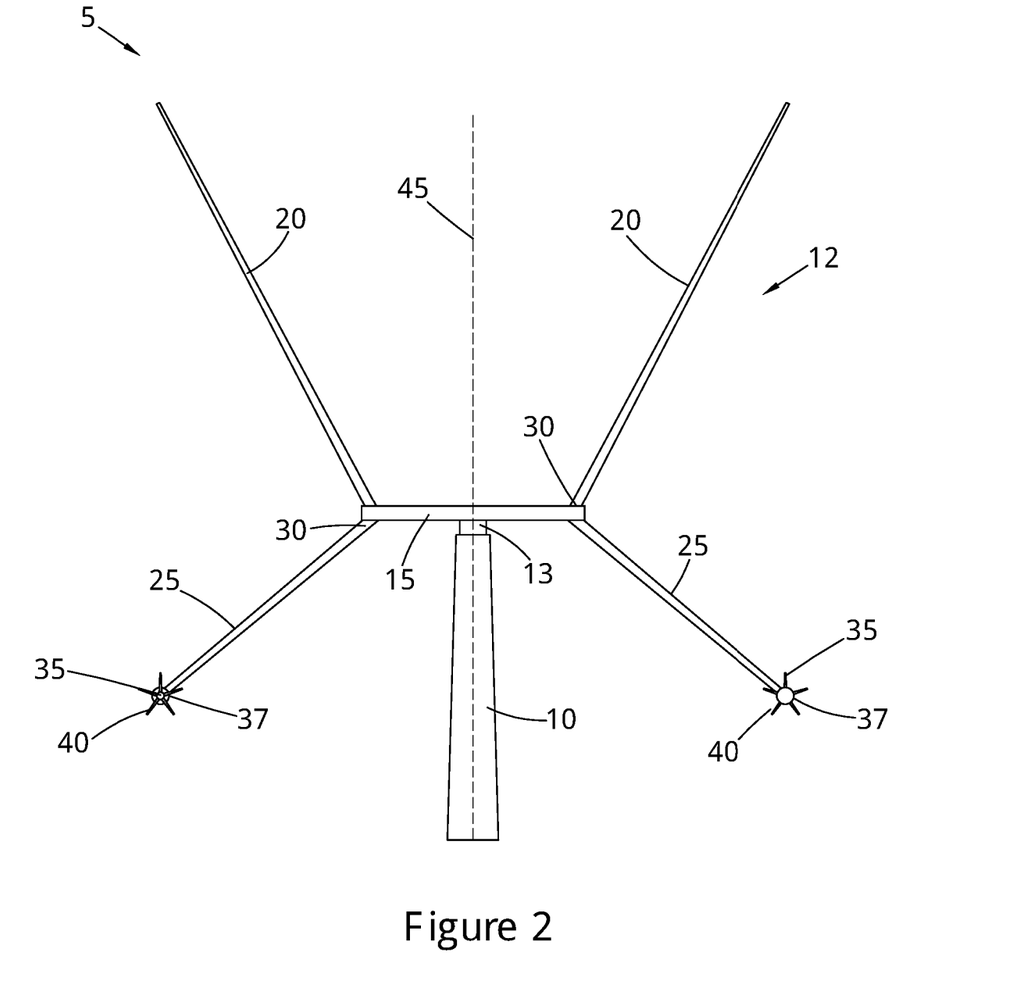
FIG. 2 shows a plane view of a vertical axis turbine.

FIG. 2 shows the planar view of the vertical axis turbine 5 of FIG. 1. The rotation axis of the first rotor 45 is shown by the dashed line.

The tips of the upper blades 20 and the lower blades 25 are the same distance from the rotation axis of the first rotor 45 and rotate at the same radius from the rotation axis of the first rotor 45. The second rotors 35 are at the tips of the lower blades 25.

The second rotors 35 are the same height from base of the tower 10. The second rotors 25 are the same distance from the rotation axis of the first rotor 45 and rotate at the same radius from the rotation axis of the first rotor 45.

As the second rotors 35 are located at a low height (e.g. 25 m or 20 m or less from the ground or sea level), they can easily be accessed from the level of the base of the tower 10. As the second rotors 35 are also lightweight and replaceable, the second rotors 35 can easily be replaced. This provides for easy and low cost maintenance.

The upper blades 20 make a smaller acute angle to the vertical than the lower blades 25. The upper blades 20, the lower blades 25 and the support member 15 lie in a plane.

Figure 3:
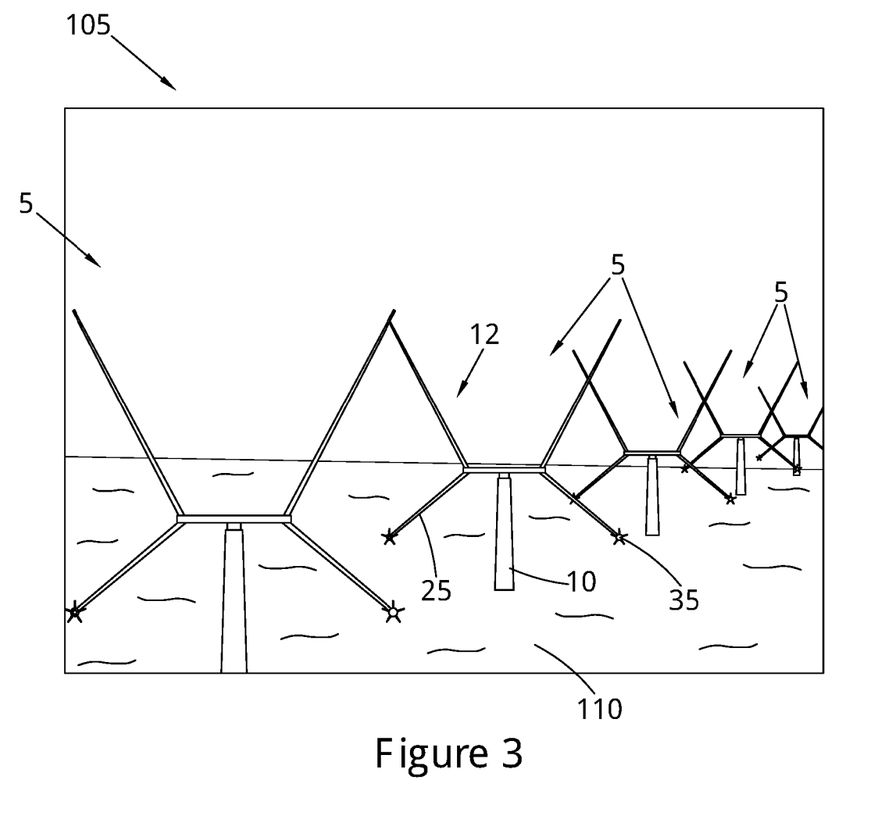
FIG. 3 shows a wind farm of the vertical axis turbines.

FIG. 3 shows an off-shore wind farm 105 of the vertical axis turbines 5. The tower 10 supports the first rotor 12 above the sea 110. The tower 10 may be supported by a floating platform or secured to the sea bed.

The lower blades 25 project downwards towards the sea 110, and the second rotors 35 are at the tips of the lower blades 25. The second rotors 35 are therefore at relatively low height and relatively close to the surface of the sea 110. Maintenance and/or replacement of the second rotors 35 is therefore relatively straightforward from a boat, as the second rotors 35 are not at a significant height.

Figure 4A:
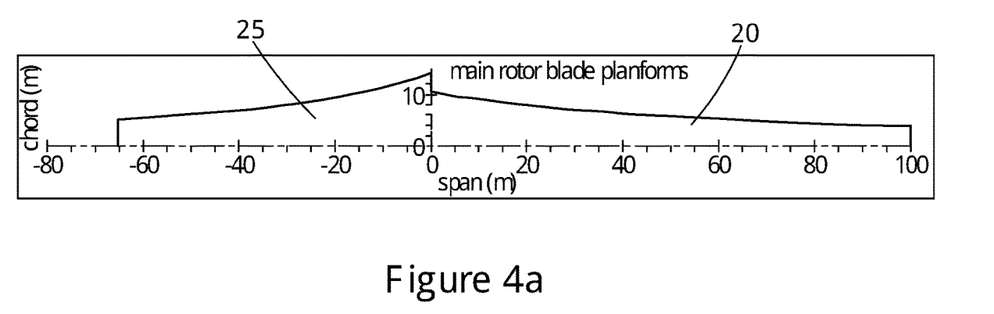
FIG. 4 shows planforms of upper, lower and second blades.

FIG. 4*a* shows planforms of an upper blade 20 and a lower blade 25. Both the upper blade 20 and the lower blade 25 are thicker at the base than at the tip. The base of the lower blade 25 is thicker than the base of the upper blade 20. The upper blade 20 is longer than the lower blade 25.

Figure 4B:
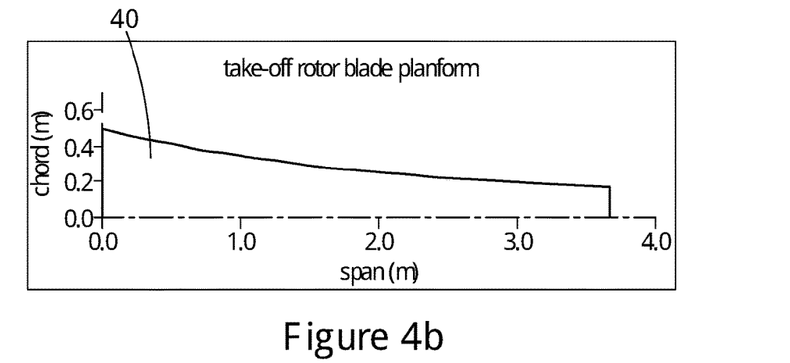

FIG. 4*b* shows a planform of a second blade 40. The second blade 40 has a similar planform to the lower blade 25, but the second blade 40 is much smaller than the lower blade 25.

In examples described above, the first and second rotors are configured so that the power take-off is by direct drive without the need for a gearbox or multi-pole generator. The first and second rotors are configured so that the power conversion of mechanical power at the first rotor is converted to mechanical power at the second rotors has high efficiency.

Although various examples have been provided above, it will be appreciated that the present invention is not limited to these specific examples but is instead defined by the claims. For example, it will be appreciated by one skilled in the art that the turbine may be scaled up or down to different sizes, and the sizes given here are exemplary only. Similarly, it will be appreciated that geometric terms are to be construed purposively. For example, the blades are 3-dimensional objections, and that they may be linear and/or straight does not prohibit, for example, tapering along the blade length. Upper and lower blade pairs may be planar, but it will be understood that the upper and lower blade pair will not exist solely in a 2-dimensional plane, but may nevertheless be planar as real 3-dimensional objects. The rotational axis of the first rotor is described as substantially vertical in use, and it will be understood that this relates to a rotational axis in use which may deviate from being completely vertical in use, for example makes an angle to the vertical of less than 15°.

It will be appreciated by one skilled in the art that the turbines disclosed above are equally applicable as on-shore and off-shore wind turbines, and that the turbine described may be used elsewhere, for example as a tidal stream turbine. Furthermore, if the turbine disclosed above were to be used as a wave turbine, it will be appreciated that minor modifications of the embodiments shown in the Figures may be necessary, such modifications falling within the scope of the disclosure. For example, the first rotor of FIG. 1 may have to be inversed horizontally, such that the second rotors are on the upper blades and not the lower blades. This would advantageously bring the second rotors closer to the surface of the water, which would provide the benefit of easier access and lower maintenance costs.

The invention claimed is:

1. A vertical axis turbine comprising:
a first rotor and at least one second rotor,
the first rotor being configured to rotate around a first rotation axis, wherein the first rotation axis is vertical or more vertical than horizontal in use;
the at least one second rotor being provided on, comprised in or coupled to the first rotor such that the first rotor is operable to move the second rotor upon a rotation of the first rotor,
wherein the at least one second rotor is operable to drive a power take off system,
a tip speed ratio in use at a rated wind speed of the at least one second rotor is in a range from 3 to 4,
the first rotor and the at least one second rotor in use at a wind speed below the rated wind speed have a combined tip speed ratio in a range from 14 to 16; and
the at least one second rotor in use at the wind speed below the rated wind speed has an aerodynamic thrust coefficient (CT) to aerodynamic power coefficient (CP) ratio of more than 0.75.

2. The vertical axis turbine according to claim 1, wherein:
the first rotor in use at the wind speed below the rated wind speed has a tip speed ratio in the range from 4 to 5; and/or
the first and the at least one second rotor in use at the wind speed below the rated wind speed have a combined tip speed ratio of 15; and/or
the first rotor in use at the wind speed below the rated wind speed has an aerodynamic power coefficient ($C_{p-max}$) within 5% of its maximum; and/or
a maximum tip speed of blades of the at least one second rotor in use at the rated wind speed is in a range from 0.4 to 0.6 times the speed of sound;
and/or the rated wind speed is in a range from 11 m/s to 13.5 m/s in use.

3. The vertical axis turbine of claim 1, wherein the power take-off system comprises an electricity generator.

4. The vertical axis turbine of claim 1, wherein the at least one second rotor comprises at least one second blade, and the rotation of the at least one second blade in use directly drives the power take-off system.

5. The vertical axis turbine of claim 1, wherein the power take off system is directly driven by the at least one second rotor without being driven via a gearbox; and/or the first rotor rotates on a first bearing, and the first bearing does not comprise a drive-train.

6. The vertical axis turbine of claim 1, wherein the at least one second rotor is disposed 25 m or less above the ground or sea level, in use, during an entire operation of the vertical axis turbine.

7. The vertical axis turbine of claim 1, further comprising: a variable frequency transformer or an electrical connection, wherein the at least one second rotor and/or the power take off system are controllable by suitably controlling the variable frequency transformer or the electrical connection.

8. The vertical axis turbine of claim 1, wherein the vertical axis turbine is operable to analyse a variation of power generated by the at least one second rotor and the associated power take off system in order to determine a direction of a prevailing wind.

9. The vertical axis turbine of claim 1, wherein the first rotor comprises at least one upper blade and at least one lower blade.

10. The vertical axis turbine of claim 9, wherein the at least one second rotor is provided on or comprised in the at least one lower blade.

11. The vertical axis turbine of claim 5, wherein:
the vertical axis turbine comprises a tower which supports the first rotor;
the at least one upper blade projects generally upwards and away from the tower; and
the at least one lower blade projects generally downwards and away from the tower.

12. The vertical axis turbine of claim 9, comprising two or more upper blades and two or more lower blades, wherein the two or more upper blades and/or the two or more lower blades are rotationally symmetric around the first rotation axis of the first rotor.

13. The vertical axis turbine of claim 9, wherein the overturning moment of the at least one upper blade acting on the first rotor in use acts in the opposite direction to the overturning moment of the at least one lower blade acting on the first rotor in use.

14. The vertical axis turbine of claim 9, wherein at least some of the at least one upper blade and/or the at least one lower blade are pitchable.

15. The vertical axis turbine of claim 9, wherein the upper and/or lower blades are free or unconnected at distal ends or tips thereof.

16. A method of generating power using the vertical axis turbine of claim 1, comprising:
providing the vertical axis turbine such that a fluid acts against at least one upper blade and/or at least one lower blade to drive the first rotor such that:
the rotation of the first rotor drives the at least one second rotor though the fluid; and
the fluid acts against the at least one second rotor to drive the at least one second rotor.

17. The method of claim 16, wherein the fluid is air and/or water.

18. The method of claim 16, wherein the power generated is generated by and/or extracted from the rotation of the at least one second rotor.

19. The method of claim 16, wherein the power generated is electricity.

20. A method of controlling the rotation of the first rotor of the vertical axis turbine of claim 1 in use, comprising:
pitching at least one blade of the first rotor; and/or
varying a frequency of an electrical connection or a variable frequency transformer coupled to the power take off system.

* * * * *

UNITED STATES PATENT AND TRADEMARK OFFICE
CERTIFICATE OF CORRECTION

PATENT NO. : 11,885,302 B2
APPLICATION NO. : 17/281216
DATED : January 30, 2024
INVENTOR(S) : James Carroll and William Edward Leithead It is certified that error appears in the above-identified patent and that said Letters Patent is hereby corrected as shown below:

In the Claims

Column 18, Claim 1, Line 19, after "aerodynamic" Delete "thrust coefficient (CT) to aerodynamic power coefficient (CP)" and insert -- power coefficient ($C_P$) to aerodynamic thrust coefficient ($C_T$) -- therefor.

Signed and Sealed this
Twenty-first Day of May, 2024

Katherine Kelly Vidal
*Director of the United States Patent and Trademark Office*